Aug. 20, 1946. J. T. DICKINSON ET AL 2,406,065
CONTINUOUS DISK FILTER
Filed Jan. 31, 1942 5 Sheets-Sheet 4

Inventors:
John T. Dickinson
Arthur R. Moorman
By Donald E. Payne
Attorney.

UNITED STATES PATENT OFFICE 2,406,065

CONTINUOUS DISK FILTER

John T. Dickinson, Basking Ridge, and Arthur R. Moorman, Alpine, N. J., assignors to Standard Oil Company, Chicago, Ill., a corporation of Indiana Application January 31, 1942, Serial No. 429,044

12 Claims. (Cl. 210—200)

This invention relates to a continuous disk filter and it pertains more particularly to improvements in a continuous disk filter for adapting it to special uses. The invention is directed primarily to filter structure for use in the dewaxing of mineral oils but the invention is not limited to such use.

An object of our invention is to provide an improved disk filter assembly which can easily be fabricated, adjusted, repaired and operated, an assembly which avoids the numerous disadvantages inherent in all such assemblies heretofore known. A further object is to provide a unitary assembly which may be successfully employed for handling liquefied gases such as propane or other volatile solvents, diluents and the like, which assembly may be continuously operated and controlled with minimum losses of gases, vapors or liquids and with maximum efficiency. A further object is to provide an improved correlation of structural elements and controls whereby the filter may be assembled and operated at minimum expense and with maximum effectiveness.

A further object of our invention is to provide a compact filter with maximum filter area and to markedly increase the filter rates obtainable. A further object is to minimize the holding time in the filter of a slurry which is undergoing filtration and to prevent undue settling out of solids from such slurry.

A further object is to provide a new and improved structure for filter disc sectors, means for securing filter elements to said sectors and means for keeping said filter elements out of direct contact with a scraper or cake deflector. A further object is to provide an improved method and means for washing and drying a filter cake on disk filter sectors and for back washing and cleaning the filter elements on said sectors.

A further object is to provide a new and improved cake discharge system including means for correctly and automatically positioning the scraper blade or deflector with respect to all parts of the filter disk sector and means for automatically compensating for any slight radial sector disalignment. A further object is to provide means for simultaneously regulating the position of all scraper blades in the filter assembly.

A further object is to provide improved methods and means for inspecting the operation of a closed pressure filter and for regulating the operation thereof from a point outside of the filter.

A further object is to provide improved method and means for avoiding filter slurry contamination by wash liquid running down the tie rods.

A further object is to provide an improved filter structure for effecting the separation of wax from a cold propane oil solution whereby more rapid filter rates, higher dewaxed oil yields, better wax cakes and lower pour point differentials are obtainable than have heretofore been possible. Other objects will be apparent as the detailed description of our invention proceeds.

Briefly, our invention comprises a unitary pressure vessel containing a horizontal rotatably mounted shaft which supports a plurality of filter disks. Individual slurry pans are provided in the lower part of the chamber for each filter disk, the pans being only slightly wider than the thickness of the filter disk, being interconnected by conduits for uniform operation and being securely welded to the filter structure. A single liquid level control device automatically maintains a slurry level in each and all of these pans.

Wax discharge hoppers are mounted between adjacent pans on one side of the assembly and these hoppers direct the wax cake to a screw conveyor which removes the wax cake from the filter. An important feature of our invention is the "floating" deflector blades which may be adjusted upwards, sidewards and laterally, which are held under substantially uniform tension and which automatically follow the contour of the filter sectors regardless of any slight misalignments. The position of all of these scraper blades may be changed by a single externally operated control.

Cake washing and filter cleaning liquids may be sprayed against the filter elements in their upper position and an outstanding feature of our invention is the method and means for preventing such liquids from contaminating the liquid slurry. Any liquids which run down the tie rods are caught in specially designed cups and are thus deflected into a catch pan which may lead to the cake discharge hoppers or to a separate draw-off line.

Individual sectors have convex instead of flat surfaces and the filter element is held against the convex surfaces by a continuous wire wrapping. By employing continuous wire wrapping instead of welding the wire at each edge of the sector we avoid untold breakage difficulties. The convex shape of the sector cooperates with the wire wrapping for holding the filter element in place. The wire wrapping protects the filter element from direct engagement with the scraper blade and thus prevents the smearing of wax into the pores of the filter element and protects the filter element against undue wear.

Each face of the filter sector is provided with parallel and relatively shallow channels which are closed at one end and which communicate with a filtrate removal trough at the other. As the sector moves upwardly the filtrate flow is downward through the channels to the trough so that the channels are rapidly emptied but as the sector moves downwardly on the other side of the filter the closed end of these channels acts as a dam and each of the channels remains full of liquid. In the blow-back operation this liquid is forced uniformly through the entire filter element for discharging wax cake therefrom and for effectively cleaning the filter element for reuse.

Each sector of a given filter disk communicates with a separate horizontal duct in the rotating shaft and this duct in turn communicates with the master valve leading to the filtrate port, the wash-liquid port and the blow-back port respectively. Any one of these ducts may be selectively closed without interferring with the operation of the remaining ducts and without the necessity of opening the filter casing. The position of the master valve may be regulated from a point outside the pressure chamber while the filter is in operation. These regulating means may be operated in accordance with the condition of the wax cake apparent from visual observation through windows or peel holes in the filter casing which are kept clear by individual propane sprays or sprays of other liquids.

The invention will be more clearly understood from the detailed description of a preferred embodiment thereof read in conjunction with the accompanying drawings which form a part of this specification, in which similar parts are designated by like reference characters and in which.

The filter assembly is enclosed in a pressure vessel, shell or casing 10 which may be provided with a removable head but which is preferably provided with a removable manhole cover 11 for permitting access to the interior thereof. The pressure vessel 10 may be mounted on suitable lugs 12 resting upon a concrete foundation or steel support. In each end of the vessel lugs 12' (Figures 2 and 3) are welded, preferably above certain of the supporting lugs 12, and these internal lugs support I beams 13 which carry bearings 14 in which shaft 15 is journaled. One end of this shaft is connected by coupling means 16 to a driving shaft 17 journaled in sleeve bearing 18, a suitable stuffing box 19 being provided to prevent the escape of any gases from the pressure vessel. At the other end of this shaft we provide a master valve 20 held against suitable bearing surfaces on the shaft by a spring or other resilient means 21. The angular position of the master valve may be controlled by rod 22 pivotally connected to a lug 23 and extending through the casing wall through a gas tight packing to external control means 24.

The filtrate port of the master valve is connected by flexible conduit 25 to a filtrate line connection 26. The wash-liquid port of the master valve is connected by flexible conduit 27 to a wash-liquid line connection 28. The blow-back port of the master valve is connected by flexible conduit 29 to a blow-back line connection 30.

Figure 3:
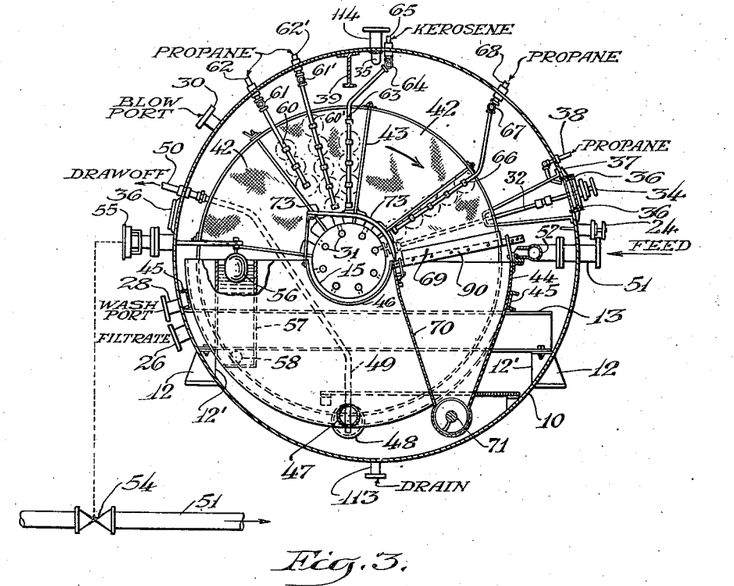
Figure 3 is a transverse vertical section or end elevation through the filter assembly.

Shaft 15 is provided with horizontal ducts 31 which communicate with the master valve and with the various filter disk sectors. A valve is provided in each of these ducts adjacent the master valve and any one or more of these ducts may be closed by means of a retractable wrench 32 which may engage valve closure means 33 and which may be retracted and externally controlled by external control means 34. Valve control means 34 is immediately behind valve control means 24 in Figure 1 as shown in Figure 3. In Figure 3 the valve control means 34 is shown to be above valve control means 24 and in line with the "peep hole" windows (rod 32 does not extend through the peep hole window but is back of it).

Electric lights 35 are provided in the pressure vessel for illuminating the interior thereof. Peel holes 36 are spaced at intervals along the casing and secured thereto by suitabel flanges 37. These peep hole windows are of double glass structure for preventing the condensation of moisture on the outside glass at low temperatures and the inside glass is sprayed with propane from lines 38 so that clear vision may at all times be assured. These peep holes may be opposite the filter cake discharge assembly and opposite the liquid level control valve, the master valve, etc.

Figures 1, 1A, 2:
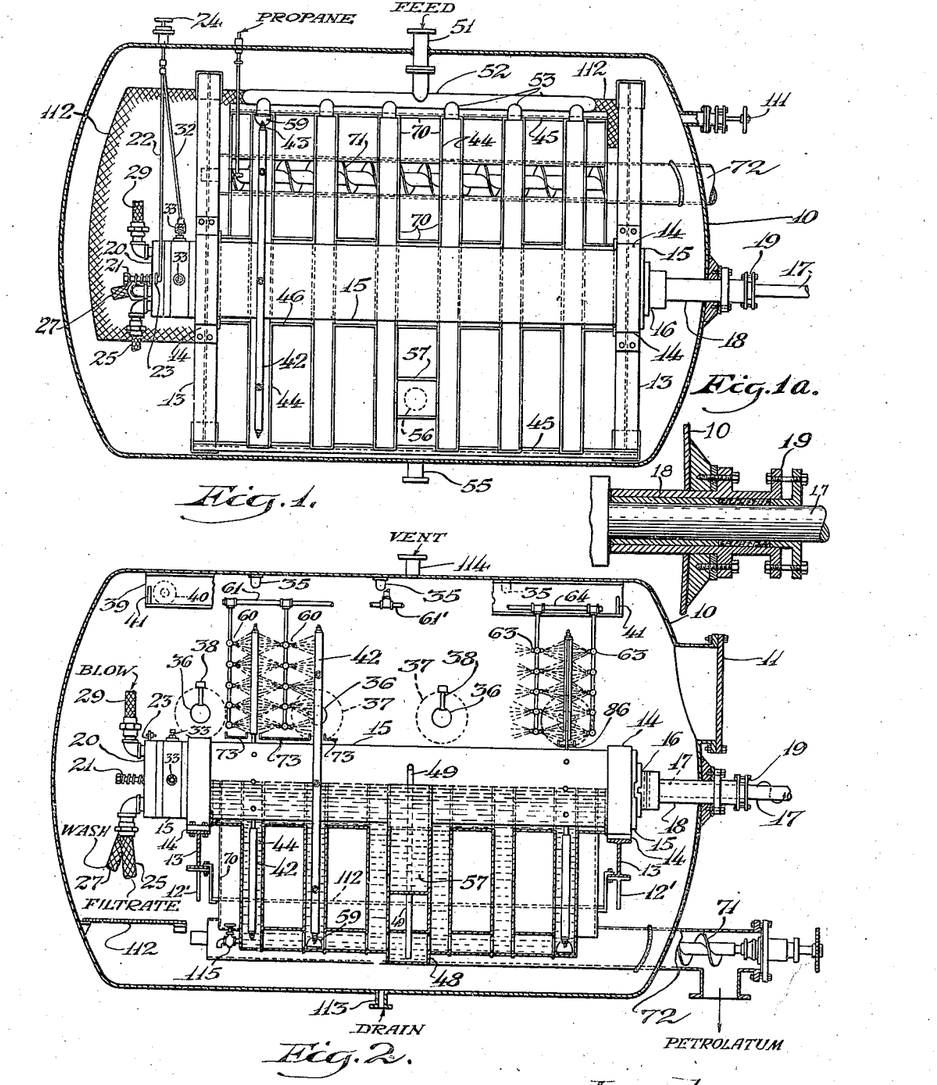
Figure 1 is a horizontal plan of the filter assembly looking down with the upper part of the filter removed.
Figure 2 is a vertical section or side elevation with parts of the structure omitted for the purpose of clarity.
Figures 5, 6, 8:
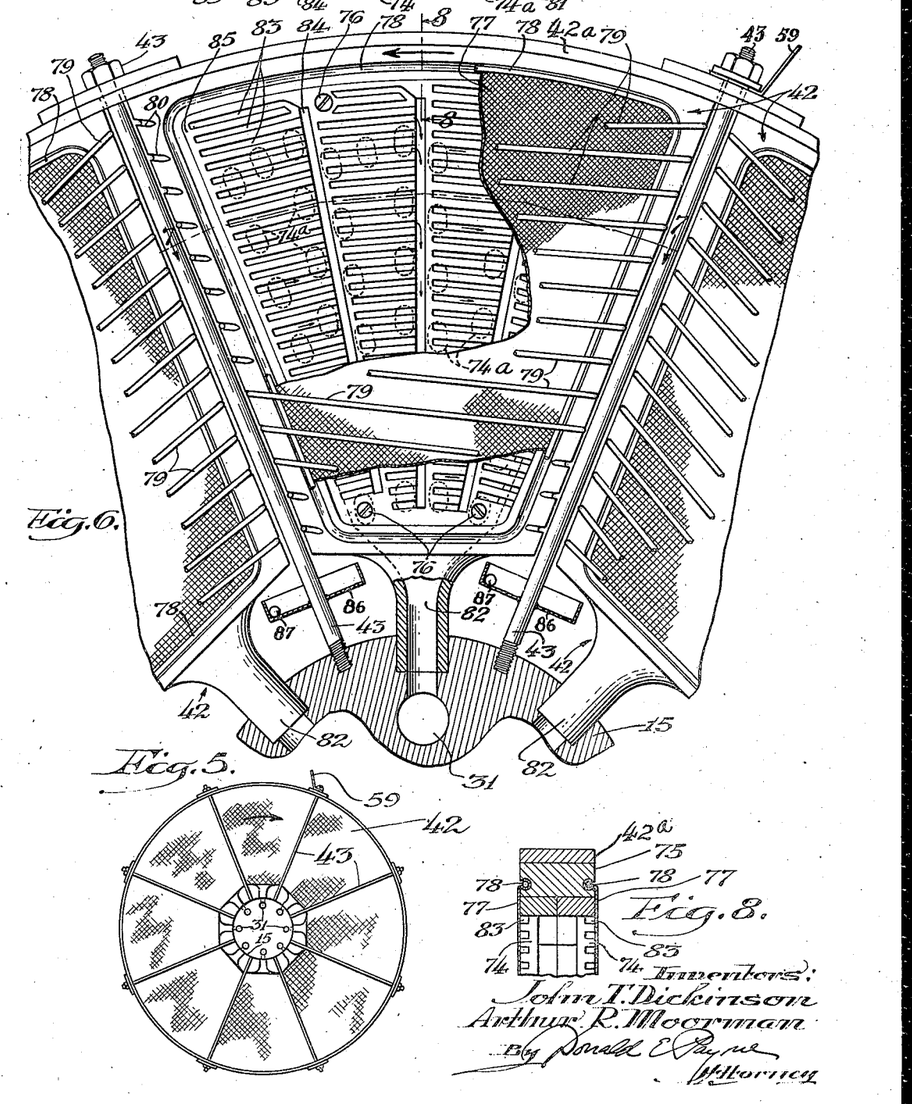
Figure 5 is a side elevation of a filter disk.
Figure 6 is a more detailed elevation of a portion of the filter disk showing a filter sector with parts removed for clarity.
Figure 8 is a detailed section of one end of the sector taken along the lines 8—8 of Figure 6.

To facilitate assembly and repair of the filter we may provide a trolley beam 39 along the inner top of the pressure vessel. Wheels 40 of a traveling crane or equivalent lifting and conveying means may run back and forth on this I beam between stops 41 (Figure 2). The filter sectors 42 are clamped on shaft 15 by tie rods 43 and steel strap 42a, after the shaft has been mounted in bearings 14, each filter sector leading to its corresponding duct 31. From 4 to 24 sectors may make up a disk, 8 sectors being illustrated in the drawings. Also any number of disks may be mounted along the shaft, 6 disks being illustrated in the drawings. A filter disk assembly is illustrated in Figure 5 and the detailed structure thereof will hereinafter be more fully described.

Figure 4:
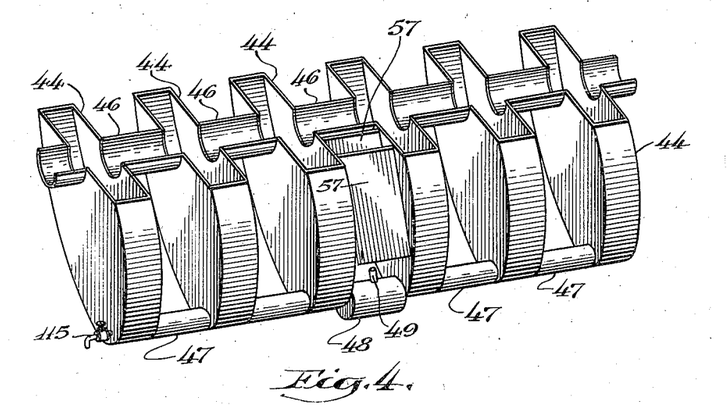
Figure 4 is an isometric view of the filter slurry pan arrangement.

The lower half of each disk is surrounded by a slurry pan or tank 44 which is welded to channel beams 45 mounted on I beam 13. These individual slurry pans fit rather closely around the lower half of the filter disk leaving room, of course, for the deposit of a filter cake of desired thickness. The arrangement of these slurry pans is most clearly shown in Figure 4. The upper parts of these pans are connected to each other by hemicylindrical shells 46 which surround the lower half of shaft 15. The bottoms of these tanks are connected to each other by conduits 47 and a sump 48 is provided in order that all slurry may be removed from the tanks through line 49 to draw-off line 50. A slurry is introduced into these tanks through feed line 51, manifold 52 and branch lines 53 (Figure 1). The rate at which feed slurry is introduced into the pans is regulated by valve 54 in accordance with liquid level control means 55 which is actuated by a float 56 in liquid level well 57 which communicates with one or more of the tanks 44 by openings 58. When the slurry level tends to get too high valve 54 is gradually closed and when the slurry level tends to get too low, valve 54 is gradually and automatically opened.

The use of individual and relatively small pans is an important feature of our invention because it prevents the hold-up of a large amount of slurry liquid. In the filtration of wax from propane-oil solutions it has been found that the elimination of slurry hold-up brings about a remarkable increase in filter rates. For dewaxing as well as for other purposes it is desirable to prevent sedimentation in the slurry tanks and for this purpose we provide agitator or scraper blades 59 on the ends of tie rods 43 so that as the disk rotates in the slurry pans these agitator or scraper blades prevent sedimentation and maintain solids in uniform suspension. Any number of such blades may be mounted around the periphery of the disk, on the tie rods or elsewhere.

In the upper part of the pressure vessel and on both sides of the filter disks we provide liquid spray means 60 which are supplied with liquid such as propane through manifold 61 and line 62 for washing oil from a wax filter case. Any number of such sprays may be employed. Similarly we may employ sprays 63 of kerosene or any other wash liquids, such sprays being manifolded by line 64 connected to line 65, for periodically washing the filter leaves. Disk sprays 66 manifolded by line 67 and supplied with liquid propane through line 68 may also be employed for spraying the disk at about or just prior to the point of filter cake discharge. This provides a moist cake for discharge and it provides the blow-back liquid in corrugations as will be hereinafter described.

The filter cake is discharged by the conventional blow-back through the filter leaves and is deflected by deflector blades 69 into troughs 70 for removal from the system by screw conveyor 71 in conduit 72. The troughs 70 are between walls 44 of adjacent pans but extend downwardly for discharging filter cake to screw conveyor 71 in conduit 72 as shown in Figure 3.

In order to prevent run-down wash-liquid from contaminating filter slurry we provide catch pans 73 between adjacent disks above shaft 15. This catch pan serves as a trough to deflect any run-down liquid into troughs 70.

Figure 7:
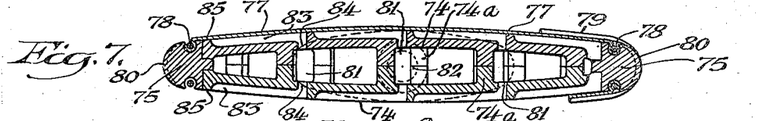
Figure 7 is a vertical section of a filter sector taken along the lines 7—7 of Figure 6.

Referring now to Figures 6, 7 and 8 we will describe in greater detail the structure of our improved filter sectors. These sectors may be formed by pre-cast complementary side members 74 provided with registering portions or bosses 74a. The side members are held together in peripheral member 75, which forms the leading and trailing edges of the sector, held together by bolts or screws 76. The walls of the side members are convex and a filter element 77 is sealed and held in place thereon by caulking means 78, for example by use of a rope caulking means in a suitable caulking groove in peripheral element 75. Instead of individually caulked filter elements we may of course employ filter bags or any equivalent structure but we prefer to employ the caulking arrangement in order that the leading and trailing edges of the filter sector may be more readily adapted to serve as a guide for wire wrapping 79. The leading and trailing edges of the sector are provided with grooves 80 or with lugs or equivalent guide or spacing means and a wire is spirally wrapped around the filter element on the sector to hold the filter element in place during blow-back operations and to protect the filter element against the scraping action of the filter disk deflector blade. The convex surfaces of the filter sector and this wire wrapping constitute an outstanding feature of our invention because it prevents any appreciable flexing of the filter element during blow-back operations; in other words, the convex surfaces make it possible for the wire to secure the filter element in a manner which would be impossible on filter sectors having flat sides. The continuous wire wrapping is important because it has been found that individually welded wires are entirely unsatisfactory and lead to constant breakage problems. It will be noted that the wire wrapping is at substantially right angles to the radius of the filter disk so that the wires may slide freely against the cake deflector and prevent this cake deflector from scraping the filter surfaces.

The complementary side wall sector elements are designed to provide channels 81 leading to the discharge opening 82. Both sides of the sector are provided with recesses or corrugations 83 which empty into troughs 84 and channels 81 for conveying filtrate from the filter element to ducts 31 in shaft 15. An outstanding feature of our invention is the design and arrangement of these troughs or corrugations 83. The word "corrugations" is intended to mean a depressed area or space in which liquid may be collected. One end of these corrugations is closed by a dam 85. During the filtration and initial washing period when a filter sector is moving upwardly, these dams are above troughs 84 so that all liquid is quickly and completely drained out of the corrugations. During the latter part of the washing step and as the sector moves downwardly toward the cake discharge point in the cycle the dams are in the lower position so that each of these corrugations tends to remain full of liquid. The filter sector as shown in Figure 6 is moving in a counter-clockwise direction; the filter sectors in Figure 3 are moving in a clockwise direction. When the sector reaches the blow-black point it is thus liquid instead of gas which is initially blown back through the filter element and by the means hereinabove described we may supply a relatively small amount of blow-back liquid throughout the entire area of the filter sector. Liquid blow-back is remarkably more effective than gas blow-back in obtaining a clean cake discharge, in preventing any plugging of the filter and in reconditioning the filter for reuse. After the liquid has been blown back from the corrugations through the filter element a considerable amount of blowback gas passes through the filter element and the continuous introduction of this blow-back gas into the filter supplies a considerable amount of the pressuring fluid for the operation of the filter.

Figures 12, 13:
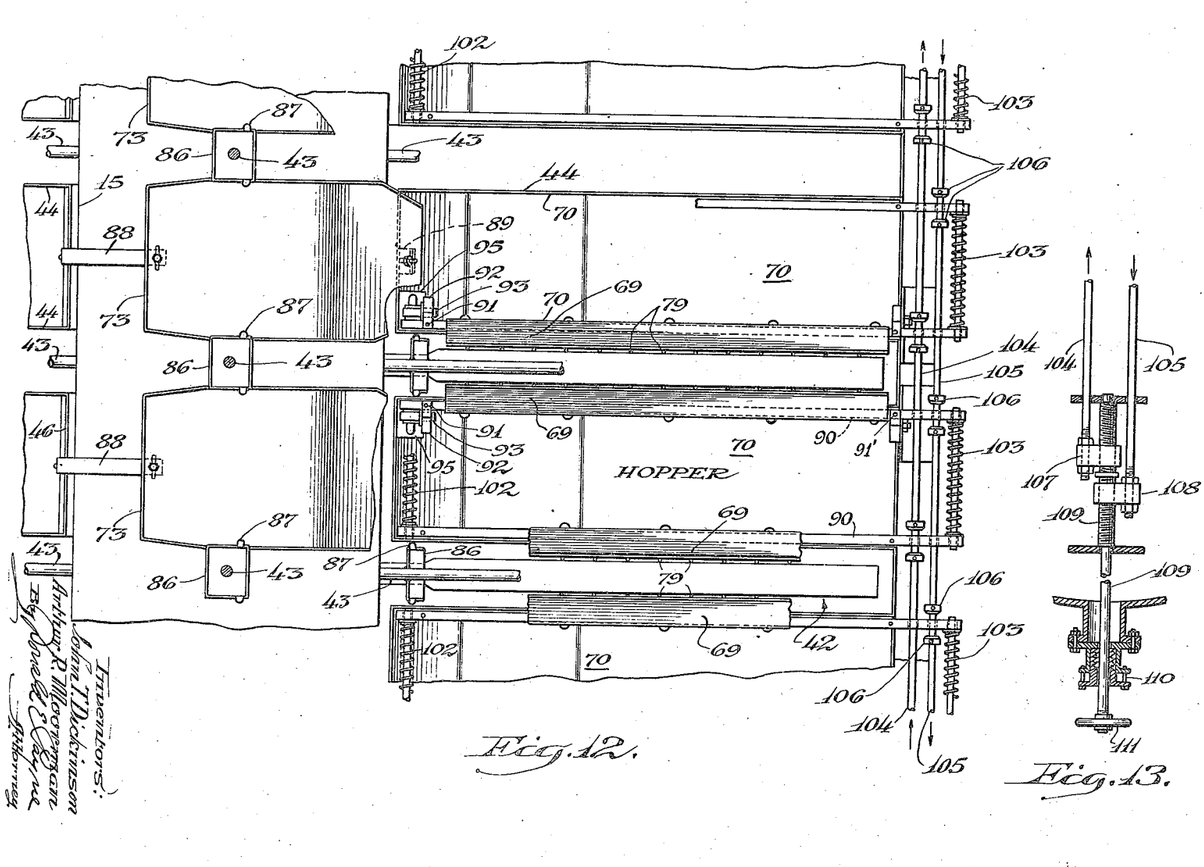
Figure 12 is a plan view of the deflector arrangement taken along the line 12—12 of Figure 9
Figure 13 is a detailed section of the retractable rods for regulating the position of the deflector blades.

We have already described the catch pan for preventing run-down liquid from contaminating slurry in tanks 44 but we have found that additional means must be provided to prevent run-down liquids on the tie rods from contaminating the slurry in tanks 44. We therefore mount cups 86 at such low point on each tie rod that they will collect any run-down liquid and we provide these cups with pouring spouts 87 for deflecting this run-down liquid into catch pans 73 or into receivers (not shown) for separate removal. The use of such cups on the tie rods is particularly important in those cases where the filter element is washed with kerosene or any other liquid which is desirably kept out of the slurry undergoing filtration. The catch pans 73 are sufficiently tapered at each end to avoid interference with cups 86 and these catch pans are adjustably mounted at one end to brackets 88 and at the other end to brackets 89 as is clearly shown in Figure 12. Catch pans 73 may discharge into a separate draw-off line instead of into the wax trough.

The structure of the cake deflector and the mounting therefor are clearly shown in Figures 9 to 13 inclusive. Deflector blade 69 is secured to a floating beam 90 which is pivotally mounted at each end on pintles 91 and 91' carried by support arms 92 and 92' which in turn are mounted on pivots 93 and 93'. Pivot 93 is carried by the end of bolt 94 which may be set at any desired position by means of lock nuts 95. Bolts 94 extend through a bracket or lug 96 which may be welded to a wall of trough 70 or which may be adjustably secured thereto by bolts or other conventional means. Similarly, pivots 93' may be held in adjustable vertical position in slots 97 by means of bolts 98 and the bracket 99, which carries the upturned member containing slot 97, may be adjustably mounted on the outer edge of trough 70 by means of bolts 100, the lateral positioning being possible by virtue of slots 101. From the structure hereinabove described it will be seen that beam 90 and deflector 69 may be adjusted in any direction and that this beam will have freedom of motion both around pivots 93 and 93' and around pintles 91 and 91'.

Figures 9, 10, 11:
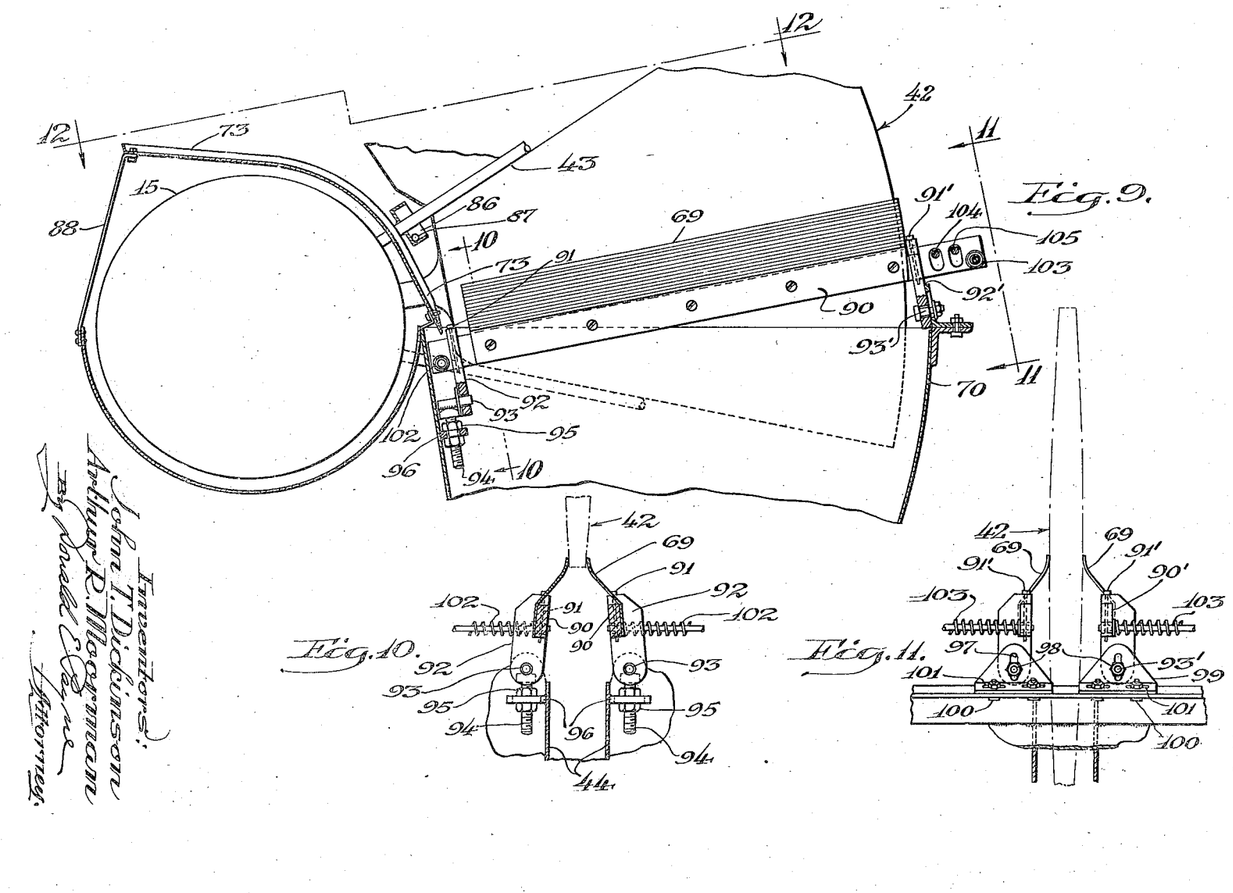
Figure 9 is a detailed elevation of the deflector assembly illustrating the method of mounting the deflector on the wax trough and the cooperation of the catch pan with the wax trough.
Figure 10 is a detailed section of the deflector assembly taken along the lines 10—10 of Figure 9.
Figure 11 is a detailed section taken along the lines 11—11 of Figure 9 when the sector is in more advanced position.

Compression springs 102 and 103 urge the inner and outer ends of the beam toward the filter disks and thus hold deflector blade 69 against the wire wrapping on each sector. In Figure 10 it will be observed how the deflector blades engage the sector at its narrowest cross section and in Figure 11 it will be observed how the pivoted supporting arms permit the deflector blades to follow the contour during the rotation of the disk. Pintles 91 and 91' permit the deflector blade to fit tightly against the wire wrapping even if there is slight radial misalignment of the filter disk.

Retractor rods 104 and 105 extend loosely through openings in outwardly extending ends of beams 90 and collars 106 are keyed on these rods on both sides of alternate beams. The ends of these retractor rods are adjustably secured to threaded collars 107 and 108 the threads in collar 107 engaging left-hand threads and the threads in collar 108 engaging right-hand threads on rod 109 which extends through stuffing box 110 to external control means 111. By turning hand wheel 111 in one direction each of the deflector blades may be thus moved toward its corresponding filter disk and by turning the hand wheel in the other direction each of the deflector blades may be moved away from its corresponding filter disk and entirely out of contact therewith.

It will thus be seen that we have provided means for observing the operation of the pressure filter and means for operating the master valve 20, for controlling the opening in the filter ducts 31, and for controlling the position of the filter cake deflectors 69 all from points outside of the pressure casing. The supply of wash-liquids and the control of the cake removal means is likewise outside of the pressure casing. If for any reason it should be necessary to make repairs, fluids may be withdrawn from the filter and access may be obtained by removing man-hole cover 11. Workmen may enter the filter and stand on gratings 112 while making the necessary repairs. A drain line 113 is provided for removing any liquids that may accumulate in the bottom of the pressure vessel and a gas vent 114 may be connected to suitable pressure indicator, safety valve, and control means and may lead to any suitable blow-down tank. If desired the slurry from tanks 44 may be discharged into the filter shell through valved means 115.

The improved filter structure and filter assembly hereinabove described is particularly adaptable for the dewaxing of mineral oils with selective solvents or with normally gaseous diluents. Such filters may be employed for example in the system described in Forrest et al. 2,143,872. The method of operating our improved filter should be apparent from the above detailed description. To summarize briefly, a slurry of crystalized wax in liquid propane may be introduced through line 51 (Figure 3) to pans or tanks 44 in amounts controlled by valve 54 which is opened or closed in accordance with liquid level control means 56. The vaporization of propane from the slurry as well as liquid propane used for washing, as will be hereinafter described, builds up a pressure in the vessel which forces the liquid propane together with dissolved oil through the filter elements while leaving the wax crystals as a filter cake on the outside of the filter element. The filtrate of liquid propane and dissolved oil flows through the passages in the filter disk and thence from the filter disk through opening 82 to a horizontal duct 31 in shaft 15 (Figure 6). Each of these horizontal ducts is provided with a separate valve indicated by valve closures 33 (Figures 1 and 2) which can be controlled from outside of the filter casing by means of retractable wrench 32 so that when visual observation through peepholes 36 indicates that any particular sector is not functioning properly the flow through that sector may be stopped. The ducts 31 in shaft 15 lead to master valve 20 which is well known in the art and hence requires no further description. Such a valve, for example, is described in detail in U. S. Patent 1,659,699. The filtrate from the master valve is withdrawn through flexible conduit 25 and discharged from the casing through line 26.

As the filter is rotated by driving means 17 (the portion of the shaft 17 which extends outwardly from bearing 18 and stuffing box 19), that portion of the disk which was previously immersed in the slurry is raised out of the slurry and the communication of each sector which is raised out of the solution is changed by the master valve from a filtrate port to a "wash port" so that liquids passing through the filter are now removed through lines 27 and 28 instead of through lines 25 and 26. Wash liquid which is preferably liquefied propane is introduced through lines 62, 62', etc. and is distributed by lines 61 and nozzles 60 as a spray over the wax cake on the filter elements. A portion of this wash liquid vaporizes to supply the pressure in the filter for forcing the liquid through the cake and the filter element. Wash liquid which runs down the filter sectors while they are in the upper position is caught by pans 73 and is deflected away from the slurry tanks 44 so that it will not contaminate or warm up the slurry which is undergoing filtration. Some liquid may run down tie rods 43 and in order to prevent such liquid from contaminating the slurry, cups 86 are provided which accumulate any run down liquid while in the vertical position and pour this accumulated liquid into pan 73 through spouts 87 as the cup moves downwardly during the rotation of the filter.

To facilitate filter cake discharge it is desirable that the cake be moist and additional propane may be introduced through line 67 for that purpose. Filter cake is discharged by conventional blow-back through the filter leaves and is deflected through chutes 70 to conduit 72 through which the wax or petrolatum is discharged. If deflectors rub on the filter element itself it may smear the crystalized wax over the filter element causing it to become clogged. During the blow-back or discharge operation there is a tendency for the filter element to be distended by the blow-back gas. To prevent appreciable distension and also to keep the filter element out of contact with the deflector it is desirable to have a wire wrapping but the use of wire wrappings on ordinary flat sided filter sectors presented such serious problems that heretofore no apparatus of this type has proved commercially satisfactory for propane dewaxing operations. By employing the convex filter element supporting surfaces and effecting the wire wrapping in the manner hereinabove described these problems were solved. The use of convex surfaces, however, provided a new problem of deflector design because the deflector, to be effective, must follow the contour of each sector as it passes the wax removal stage. The deflector mounting as hereinabove described permits the deflector to follow the contour of each sector during the continuous rotation of the disk.

Another feature of the invention facilitating cake discharge and cleaning of the filter medium is the arrangement of corrugations and dams shown in Figure 6. As the filter sectors move downwardly from the washing position to the cake discharge position, these dams retain liquid in the corrugations. When the filter sector is connected through the master valve with the blow-back port, this liquid is forced in a reverse direction through the filter element, this liquid blowback being remarkably effective for obtaining a clean cake discharge, for preventing any plugging of the filter and for reconditioning the filter for reuse. After this reconditioning step the filter is again immersed in the slurry and the above sequence of steps is repeated. From time to time the operation of the filter may be discontinued and the filter elements may be washed with kerosene, introduced through line 65 for dissolving any deposits on the filter elements which are not soluble in propane. The invention is not limited, however, to the use of normally gaseous liquids nor to the dewaxing of mineral oils but may be employed for any purpose where it is desired to separate filterable solids from liquids. While we have described a preferred example of our invention it should be understood that our invention is not limited to the structure or details of construction hereinabove described since various modifications and alternative constructions will be apparent to those skilled in the art from the above detailed description.

We claim:

1. In a continuous rotary disk filter comprising a casing, a substantially horizontal rotatable shaft in said casing, a plurality of filter sectors mounted on said shaft to form a plurality of filter disks, interconnected slurry tanks for the lower part of said disks, a filter cake discharge means between adjacent slurry tanks, deflector blades for deflecting filter cake from said disks into said discharge means, means for mounting said deflectors for movement toward and away from the filter disks and also for movement in a radial plane of the filter disk and resilient means for holding each end of said deflectors against the filter disks.

2. The apparatus of claim 1 which includes means for permitting the observation of filter cake deflectors in said filter, and means extending through said casing and controllable outside of said casing for simultaneously moving all of said deflectors toward and away from said disks.

3. In a continuous rotary disk filter comprising a casing, a substantially horizontal rotatable shaft in said casing, a plurality of filter sectors mounted on said shaft to form a plurality of filter disks, each of said sectors being of convex surface and having filter elements secured thereto by means of a wire wrapping, interconnected slurry tanks for the lower part of said disks and a filter cake discharge means between adjacent tanks, the improved structure which comprises deflectors for bearing against said wire wrapping and directing filter cake into said discharge means, a separate beam for supporting each of said deflectors, supporting arms for said beams, means for pivotally supporting said beams on said supporting arms, brackets secured to a fixed portion of the filter structure, means for pivotally mounting said supporting arms on said brackets and means for adjustably positioning said brackets whereby the deflectors may follow the wire wrapping on the convex surfaces of the filter sector on the rotation of the rotatable shaft.

4. The apparatus of claim 3 wherein the pivotally supported beams, pivotally mounted supporting arms and adjustable brackets are employed at both ends of each supporting beam.

5. The apparatus of claim 3 wherein the beam extends beyond periphery of the filter disk and wherein the structure includes resilient means for holding the deflectors against the wire wrapping.

6. The apparatus of claim 3 which includes pivotal beam mountings, pivotally mounted supporting arms, and adjustable brackets at both ends of said supporting beam, resilient means for holding the deflector against the wire wrapping and means controllable from a point outside of the casing for simultaneously moving the deflectors toward and away from said filter disk.

7. In a continuous rotary disk filter, a casing, a substantially horizontal rotatable shaft in said casing, a plurality of filter sectors carrying filter elements mounted on said shaft to form a plurality of filter disks, said shaft and filter disks forming a rotating filter structure, interconnected slurry tanks for the lower part of said disks, means for spraying a liquid against the upper part of said disks, a filter cake discharge means, a catch pan, means for adjustably mounting said catch pan in fixed position above the level of said slurry tanks, and means secured to the rotating filter structure between the filter elements and the shaft for collecting run-down liquid, said last-named means being provided with a spout for directing said liquid into said catch pan as the filter structure rotates and said catch pan having a spout for deflecting said liquid away from the slurry tanks.

8. In a continuous rotary disk filter comprising a casing, a substantially horizontal rotatable shaft in said casing, a plurality of filter sectors carrying filter elements held on said shaft by tie rods to form a plurality of filter disks, interconnected slurry tanks for the lower part of said disks, means for applying a wash liquid on the upper part of said disk, a filter cake discharge means between adjacent slurry tanks, a catch pan mounted above said shaft between adjacent disks and provided with means for deflecting run-off liquid from filter cakes to the wax cake discharge means, and collecting cups secured to the sector tie rods between the filter elements and the shaft for collecting liquid which runs down said tie rods, said collecting cups being provided with pouring spouts so that the liquid therefrom is directed into said catch pans during the rotation of the filter disks.

9. A continuous disk filter which comprises a gas-tight casing, means for introducing a fluid into said casing for providing pressure therein, means for rotatably supporting a horizontal shaft in said casing, a horizontal shaft rotatably mounted in said supporting means, driving means outside said casing and connected to one end of said shaft, said shaft end extending through a substantially gas-tight journal to a point outside of the casing, a plurality of disk sectors, filter elements on said sectors, said sectors being mounted around said shaft by tie rods to form a plurality of filter disks, a master valve on the end of said shaft which is inside the gas-tight casing means for conveying liquid from corresponding sectors in each disk to said master valve, conduits for conveying liquids from said master valve to points outside of said casing, a conduit for conveying blow-back gas from a point outside of said casing to said master valve, a slurry tank closely disposed around the lower part of each disk, communications between said slurry tanks for maintaining substantially the same liquid level in all of said tanks, means for introducing slurry into said tanks and for regulating the liquid level of slurry therein, a cake discharge trough between adjacent slurry tanks, deflectors for deflecting filter cake from adjacent sides of said disks to said trough, means for movably mounting said deflectors so that they may follow the contour of said disks and resilient means for urging said deflectors against said disks, a catch-pan mounted above said shaft between adjacent disks and discharging into said trough, cups secured to said tie rods between said filter elements and said shaft whereby run-down liquids may be collected and discharged into said catch-pan, means for spraying a wash-liquid on the upper part of said disks, means for removing filter cake from said casing and means for controlling the operation of the filter from a point outside said casing.

10. The apparatus of claim 9 which includes agitator blades mounted on the periphery of said disks for preventing sedimentation of solids in said slurry tanks.

11. In a continuous rotary disk filter of the type comprising a casing, a substantially horizontal rotatable shaft in said casing, a plurality of filter sectors mounted on said shaft to form a plurality of filter disks, a separate slurry tank for the lower portion of each filter disk said tank being of sufficient width to permit a cake deposit on the disk but being sufficiently narrow to prevent large accumulations of filter slurry, communications between the upper parts of said tanks in the form of a substantially hemicylindrical shell around the bottom of the shaft, conduits connecting the tanks at the bottom thereof, a draw-off sump and a conduit leading therefrom for draining slurry from said tanks, a liquid level well communicating with at least one of said tanks, a liquid level indicating means in said well, means for controlling the amount of slurry introduced into said tanks in accordance with said liquid level indicating means, filter cake troughs between adjacent tanks, deflectors for deflecting filter cake from said disks to said trough, mechanical means for mounting said deflectors for movement toward and away from the filter disks and also for movement in a radial plane of the filter disk whereby they may follow the contour of the disks, resilient means for urging said deflector toward said filter disks and means for continuously removing filter cake from said casing.

12. A continuous rotary disk filter comprising a casing, a substantially horizontal rotatable shaft in said casing, a plurality of filter sectors mounted on said shaft to form a plurality of filter disks, each sector having a convex outer surface, wire positioning means at its leading and trailing edges and a spiral wire wrapping for holding a filter element against the convex surfaces of each sector, interconnected slurry tanks for the lower part of said disks, a filter cake discharge means between adjacent slurry tanks, deflector plates for deflecting filter cake from said disks into said discharge means, means for mounting said deflectors for movement toward and away from the filter disks and also for movement in a radial plane of the filter disk, and resilient means for holding said deflectors against the filter disk.

JOHN T. DICKINSON.
ARTHUR R. MOORMAN.